HEINRICH DESCHMANN
INVENTOR.

HEINRICH DESCHMANN
INVENTOR.

Patented Feb. 17, 1953

2,629,075

UNITED STATES PATENT OFFICE 2,629,075

ELECTRICAL GENERATOR WITH VARIABLE FREQUENCY AND POWER TRANSMISSION SYSTEMS

Heinrich Deschmann, Vienna, Austria

Application March 26, 1948, Serial No. 17,216
In Austria March 29, 1947

4 Claims. (Cl. 318—147)

This invention relates to means for generating alternating current with a variable frequency and to power transmission systems utilizing such current, and more particularly it relates to systems using polyphase current.

It is known to use a variable frequency for the purpose of starting an induction motor and to regulate its speed by controlling the frequency of the current supplied to it. Various arrangements of generators have been proposed where the frequency and the electromotive force generated may be varied simultaneously. Power transmission systems based upon such generators failed in all cases where a full power starting torque was required; and none of these systems was suitable to furnish a low speed torque of several times that of the full power torque at full speed.

I have found that a starting and low speed torque of several times the high speed torque can be obtained and low speed operation under full power may be accurately controlled by employing a multiphase current which is varied independently as to its frequency and its electromotive force respectively. My invention has therefore as one of its objects a power transmission system, in which a polyphase motor is supplied with current that is controlled, either manually or automatically, as to the voltage and to the frequency. Another of its objects is a generator which furnishes alternating current of a voltage that is independent of its frequency, and where the voltage may be regulated per se, and the frequency may be regulated per se without substantially affecting the voltage generated.

It is amongst the further objects of my invention to provide suitable means for controlling the relation between the voltage generated and the frequency for the purpose of fulfilling the requirements of a motor driven vehicle, such as a bus or a diesel locomotive, where the prime mover is an internal combustion engine which drives a generator while the current so generated drives a motor connected to the drive wheels.

In such cases the speed of the prime mover is not constant but preferably varies with the conditions of the load. However, it is to be understood that my system is equally well applicable in all cases where the prime mover is an engine of substantially constant speed, such as a steam or combustion turbine, or an electrical motor.

My invention has also as one of its objects an arrangement and means for preventing the stalling of polyphase motors even under the greatest possible overload conditions; or in other words, my invention provides means to give a polyphase motor the characteristic of a series-wound motor, where the torque increases up to the stalling point.

Other objects of my invention will become apparent from time to time in the following specification.

The accompanying drawings illustrate schematically how my invention may be carried out, but it is to be understood that several equivalent arrangements may be made within the scope of my invention, as will be apparent to those skilled in the art.

In the accompanying drawings—

Figure 1:
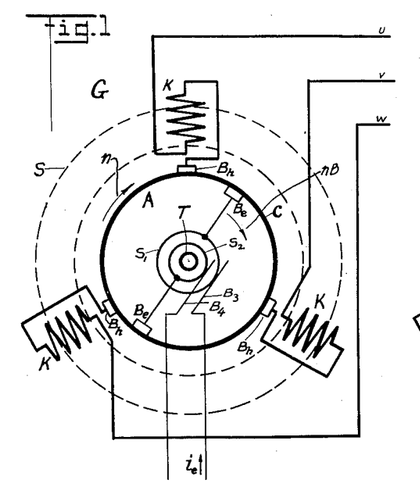
Figs. 1 and 2 show schematically the structure of a generator having independent control of frequency and voltage.

Fig. 1 shows an example of the generator G according to my invention, using the conventional signs to illustrate the windings and other elements of an electrical machine. S designates the stator which may be of the kind used in a conventional induction motor. It is provided with an open three phase winding, marked K—K—K.

Inside the stator S is the aramture A, rotatable about an axis T. This armature is provided with a D. C. winding which is connected in conventional manner to a commutator C. This commutator is illustrated as a circle, and while the D. C. winding has been left out in order not to confuse the drawing, it is supposed to be connected to each of the segments of the commutator in the manner of a D. C. armature. Two slip rings, $S_1$ and $S_2$, are mounted isolated from each other and from the other parts, and are rotatable around the shaft T of the armature A. Each of these slip rings is connected with one of the two brushes $B_e$—$B_e$, which are riding upon the commutator C. These slip rings $S_1$—$S_2$ together with the brushes $B_e$—$B_e$ are provided with a driving means (not shown) which will cause rotation of the slip rings and the brushes as a unit at a predetermined and controllable speed in the direction of the arrow $n_B$ as shown. Two stationary brushes, $B_3$ and $B_4$ serve to supply D. C. current to the slip rings.

Upon the commutator C are also riding three brushes $B_h$, each of which is connected respectively to one end of the open three phase winding K—K—K. The other ends $u$, $v$, $w$ of this winding serve as binding posts and are connected to the power lines or to the motor to be driven by the generator.

The winding K—K—K is so arranged that it causes a substantial compensation of the field of the armature A; in other words, any current generated in either the armature or in the stator, or both, will not create any field, except for leakage flux. This is the case of full compensation. For regulating purposes it is advantageous in some cases to "overcompensate" the armature through the stator, as will later be pointed out.

If it is now supposed that the brushes $B_e$ are rotated in the direction $n_B$, while the armature A with the commutator C is at standstill, there will be no voltage generated by the machine, because the effects of the rotating field upon the windings of the armature and the stator respectively are opposite to each other and compensate each other to zero. As a further step it shall now be supposed that the armature is rotated in the direction and at the speed of the arrow $n$; it is then apparent that the rotating field will induce in the stator windings K a voltage proportional to the speed $n_B$, while the voltage induced in the armature winding is proportional to $n-n_B$; the combined voltage is then proportional to the sum, that is $(n-n_B)+n_B=n$. The same result is obtained if $n_B$ is negative, that is, if the brushes $B_e$ rotate in opposite direction to the armature. It follows from these considerations that the voltage generated by this machine is always and only proportional to the speed of rotation of the armature (and of course to the magnitude of the field, that is, the exciter current which is supposed to be constant for the present consideration). It also follows that the speed of rotation of the exciter brushes does in no way alter the voltage generated by the rotation of the armature A.

If now it is supposed that the exciter brushes $B_e$ are at standstill, and the armature rotates, while exciter current $i_e$ is fed to the brushes $B_e$, it is clear that the three binding posts $u$, $v$, $w$ will carry a D. C. voltage between each other, the magnitude depending upon the relative position of the exciter brushes to the main brushes $B_h$. In other words, the machine generates now a three phase current with the frequency zero. Rotation of the exciter brushes $B_e$ causes the polarity of the brushes $B_h$ to vary with a frequency directly proportional to the rotational speed of the exciter brushes, thus producing a polyphase current with a frequency depending solely upon the rotational speed of the exciter brushes $B_e$, while the voltage generated is solely proportional to the rotational speed $n$ of the armature and the magnitude of the exciter current $i_e$.

It has thus been shown how complete independence of control for frequency and voltage respectively is obtained with a generator according to my invention. However, it is to be understood that this has been explained in an example of the simplest form, and that various other modifications can be made while staying within the scope of the same basic structure as described. Rotating the exciter brushes in the same direction as the armature has the advantage to improve the commutation of the exciter current, and also affects the losses due to resistance of the armature winding through superposition of the exciter current and the generated current.

Figure 2:
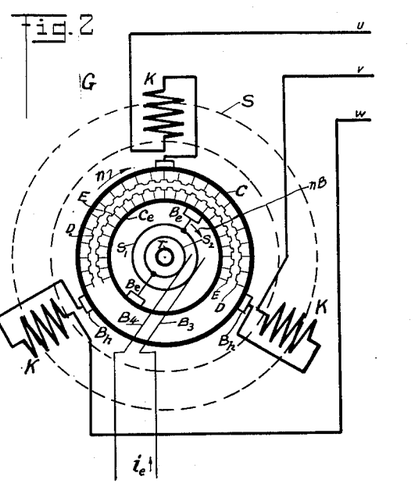

Another modification of my invention is shown diagrammatically in Fig. 2; this illustrates a generator similar to that shown in Fig. 1 with the exception, that a separate winding is used for the exciter current. Thus the armature has two windings, each in the manner of a D. C. winding, and each connected conventionally to its own commutator. Similar parts have been given the same reference number. Only the parts differing from the former will be described. The exciter brushes $B_e$ are again connected to the slip rings $S_1$ and $S_2$ respectively, and rotatable therewith as a unit. But the brushes $B_e$ are now running on the commutator $C_e$ which is connected in conventional manner to the exciter winding E. The main brushes $B_h$ are running as before on the commutator C, which are connected as before to the armature winding D. The electrical operation of this generator corresponds fully to that described above. It has the advantage of having the exciter circuit fully separated from the main windings, but requires somewhat more space for these separate exciter windings. In a machine such as described in Fig. 2, it is obvious that the relative position of the armature and stator windings could be switched, and that as long as the correct relative speed difference between the three main elements (stator, armature and exciter brushes) is maintained, either armature or stator could be the driven part.

Figures 3, 4:
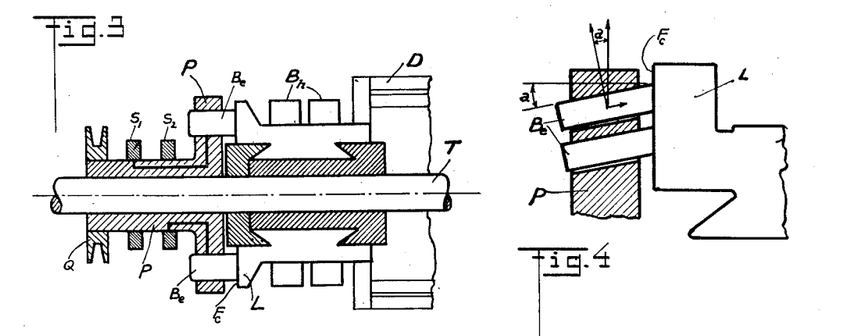
Figs. 3, 4 and 5 show details of this generator.
Figure 5:
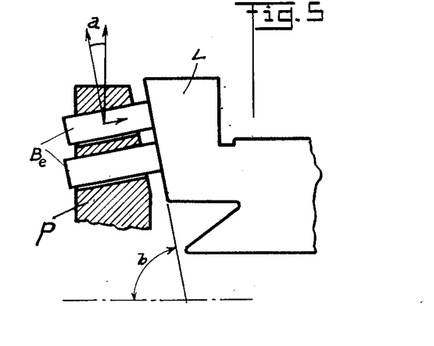

In Fig. 3 is shown how the several brushes may be arranged so as to ride upon one commutator, as described in Fig. 1. Upon the shaft T is fastened the commutator with segments L. These are connected to the winding D in conventional manner. Upon the cylindrical surface of the commutator ride the main brushes $B_h$, while upon its face $F_e$ ride the exciter brushes $B_e$. These are carried in a body of insulating material P, which in turn is freely rotatable upon the shaft T. A pulley Q serves to drive the member P at any desired speed. Fastened upon P are two slip rings $S_1$ and $S_2$ which are connected each to one of the brushes $B_h$ respectively, as described in Fig. 1. Whereas the exciter brushes could also be arranged in the customary radial manner, the arrangement of Fig. 3 has the advantage to obviate the necessity for compensating for the effect of centrifugal force upon the brushes. A further improvement is shown in Fig. 4, where the brushes are carried in slots inclined with respect to the axis of rotation at an angle determined by the formula $\tan a = m$, where $m$ is the coefficient of friction between the brushes and the material of the brush holder. Since the brushes are pressed outwardly by the centrifugal force, the springs pushing the brushes against the commutator must overcome this friction, which is variable with the speed of rotation. If the brush guides are inclined outwardly at the indicated angle, the component of the centrifugal force along the brush guide will fully compensate this frictional force. A still further improvement is obtained by forming the commutator face in the manner of a hollow cone, with its apex angle $b$ determined by cotan $b=m$. In this way the brushes are again at right angle to their riding surface, while the effects of centrifugal force are fully compensated. This is illustrated in Fig. 5.

Figure 6:
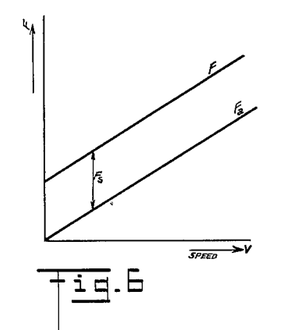
Figs. 6, 7 and 8 show diagrams relating to the control in a vehicle drive system.

An arrangement such as shown in Fig. 1 may be used advantageously to drive the wheels of a car through induction motors or synchronous motors, while the generator is driven by an internal combustion engine. In some cases it is desirable that the transmission adapts itself automatically to changes in the load condition of the vehicle, by decreasing the speed of the driving wheels whenever the resistance is greater, and increasing it with falling resistance, similar to the characteristic obtained by a series wound D. C. motor. Under certain other conditions it is desired to keep the torque of the driving motors constant during the starting and acceleration period. This means that the current in the armature of the driving motors must be held constant, and this in turn requires that the slip frequency be held constant while the speed increases, while the motor field also is held constant. Since the frequency of the current applied to the stator of the motor is the sum of the slip frequency plus the armature frequency, we find a relation between these frequencies and the vehicle speed as shown in Fig. 6. The frequency of the armature of the motor, $F_a$ is directly proportional to the rotational speed of the motor, and therefore, to the vehicle speed $v$. For zero vehicle speed it is also zero. But even at standstill the slip frequency $F_s$ is required to induce the necessary current in the armature to develop the desired torque. If this torque remains constant, this slip frequency $F_s$ must also remain constant, and the frequency $F$ of the current applied to the stator of the motor, is given by a line parallel to the line for $F_a$ and distant therefrom by $F_s$. The conditions just mentioned obtain if induction motors are used as driving motors. For a synchronous motor, the frequency required to develop the full torque at standstill of the motor is zero, while a definite and predetermined voltage must be applied in order to overcome the resistance of the windings. In other words, the diagram developed for the induction motor can be used when the slip frequency $F_s$ is made zero.

Figure 7:
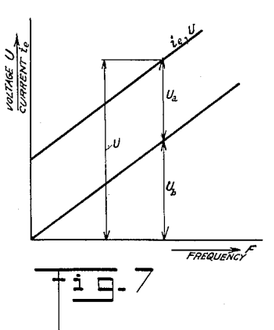

In the above mentioned case of the induction motor, it is further necessary to regulate the voltage of the generator in accordance with the diagram shown in Fig. 7 in order to obtain a constant motor torque from standstill on. The voltage losses due to resistance are constant for current, while the losses due to reactance and the induced electro-motive force increase directly with the frequency, so that the voltage of the generator G, which is the sum of all these, follows the line indicated by U. This composing of voltage is only approximately correct, because the voltage losses due to resistance and those due to reactance have a different phase angle, as has the induced E. M. F., so that an accurate layout of these conditions has to be made with vectors. In such cases where a very close compensation of all these voltages has to be made, I provide an additional set of exciter brushes, set at a predetermined angle to the first exciter brushes, to which is fed an exciter current different from and separately controlled from the main exciter current.

Figure 8:
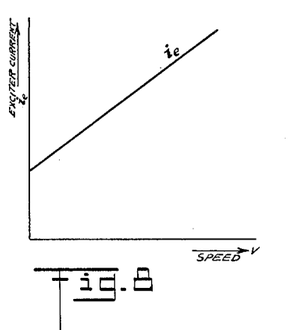

Fig. 8 finally gives the diagram for the change of the exciter current in accordance with increasing speed, under condition of constant torque of the driving motor.

Figure 9:
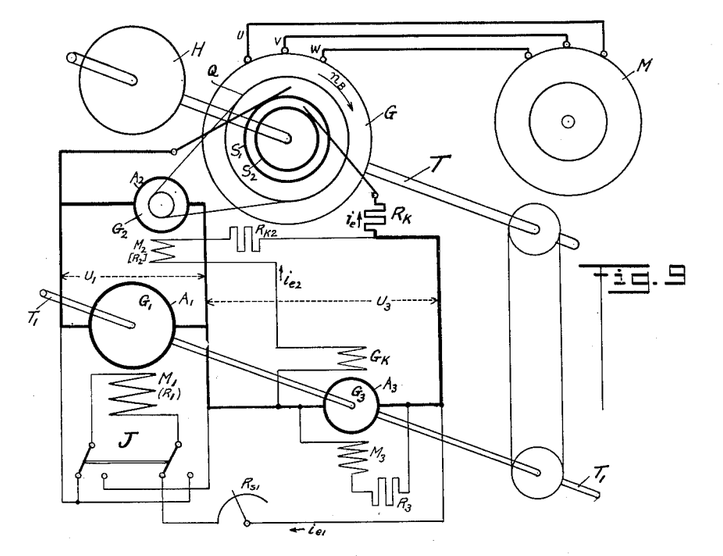
Figs. 9, 11, 13 and 14 show further arrangements for automatic control on vehicle drives.

Fig. 9 gives a schematic illustration of the arrangement in accordance with my invention, by which automatic control of the generator is obtained whereby the torque of the driving motor is held constant from standstill on. Two small D. C. generators $G_1$ and $G_3$ are provided to obtain the variable excitation current $i_e$ for the main generator G. The prime mover H drives the generator G through the shaft T and the current is delivered to the drive motor M through the wires $u, v, w$. The generator is supposed to be the same as described with Fig. 1, and all windings and other details have been omitted, except that the slip rings $S_1$ and $S_2$ are shown together with the driving pulley Q (see Fig. 3). The two generators $G_1$ and $G_3$ are on one shaft $T_1$ which is driven from the shaft T, as shown. The D. C. motor $G_2$ drives the pulley Q of the holder P of the exciter brushes $B_e$ (see Fig. 3) and thereby controls the frequency of the current developed by the main generator G. The two generators $G_1$ and $G_3$ are connected in series through the resistor $R_k$ to the slip rings $S_1$—$S_2$, while the armature $A_2$ of motor $G_2$ is connected only to the armature $A_1$ of $G_1$ generator. The field $M_2$ of $G_2$ is connected in series with the counter compounding field $G_k$ of generator $G_3$ and a resistor $R_{k2}$ is included in this circuit. The field $M_3$ of $G_3$ is connected only to armature $A_3$, while the field $M_1$ of generator $G_1$ is connected via a variable resistor $R_{s1}$ to the combined voltage of $G_1$ and $G_2$. Furthermore a switch J is included in this circuit, and shown in its normal position; the other position serves to reverse the polarity of the field $M_1$ for destroying the remanent magnetism thereof, when required. The fields of the motor $G_2$ and of the generator $G_3$ should be adjusted to at least medium saturation and the winding $G_k$ adjusted as counter-compounding winding; in this way I obtain a substantially constant field excitation of motor $G_2$ so that changes thereof can be neglected for the following consideration.

Figure 10:
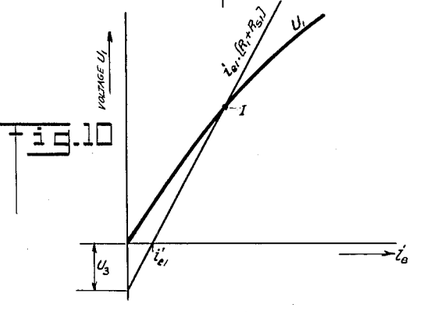
Figs. 10 and 12 show further diagrams relating to speed control.

The reversing switch J is operated each time when the vehicle is stopped, and the remanent field destroyed. Excitation of $G_1$ is obtained from the auxiliary $G_3$ and may be regulated manually by $R_{s1}$. The generator $G_1$ is constructed as a D. C. generator in the unstable range. Its characteristic is given in Fig. 10. It will be seen that the line of resistance voltage $i_{e1}(R_1-R_{s1})$ intersects the ordinate axis at a point which is $U_3$ (the voltage of $G_3$) below the origin, because the exciter current $i_{e1}$ has a predetermined value corresponding to the voltage $U_3$ whenever the voltage $U_1$ of the generator $G_1$ falls to zero. By the combination of two generators ($G_1$ and $G_3$) as described, I obtain a complete control of the degree and range of unstability in which the generator $G_1$ operates. By decreasing the voltage $U_3$, I obtain a greater degree of unstability because a small change in speed of $G_1$ causes a considerable change in the position of the "outer characteristic" of $G_1$. This in turn moves the point of intersection I of the resistance line with the outer characteristic up or down, and thereby causes a similar change of the voltage $U_1$ developed by $G_1$. This in turn causes a corresponding change of the speed of $G_2$, and of the frequency of the main generator G.

Figure 11:
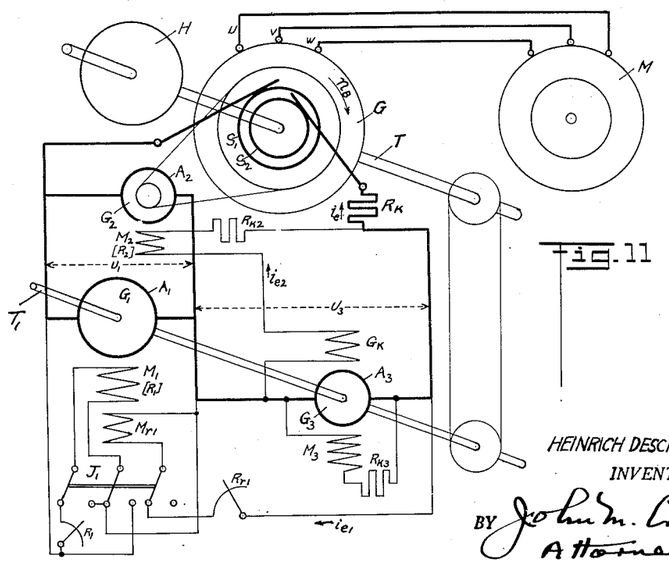

An alternative arrangement is shown in Fig. 11. The main field $M_1$ of generator $G_1$ is connected to its own armature $A_1$ through the reversing switch $J_1$ and a variable resistor $R_1$; the auxiliary field winding $M_{r1}$ is connected through the variable resistor $R_{r1}$ to the generator $G_3$. All other connections are similar to those shown in Fig. 9. The reversing switch is shown in its normal position for start and running. It is moved to the right after stopping the vehicle, and this reverses the main field $M_1$ for destroying the remanent field, while the auxiliary field $M_{r1}$ is cut off simultaneously. By this arrangement I eliminate the uncertain effects of the remanent field and obtain a predetermined effect caused by the controlled field of the auxiliary winding $M_{r1}$.

Figure 12:
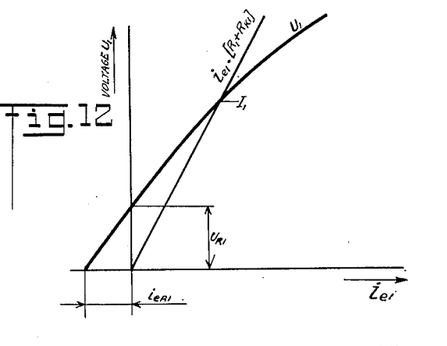

Fig. 12 is a diagram of the outer characteristic of the generator $G_1$, that is its voltage $u_1$ as a function of the exciter current $i_{e1}$; the position of the resistance voltage line is determined by the voltage generated by the auxiliary field of the winding $M_{r1}$.

In both of the above described arrangements, the automatic control operates to decrease the frequency supplied to the driving motor H whenever the load causes a slowing down of the driving main generator G. This causes also a slowing down of the shaft $T_1$ and of the generator $G_1$. Since $G_1$ is operating in the range of instability, the voltage generated by it drops rapidly and this reduces the speed of the motor $G_2$ and thereby the frequency. At the same time there occurs a reduction of the exciter current $i_e$ of the main generator G.

Figure 13:
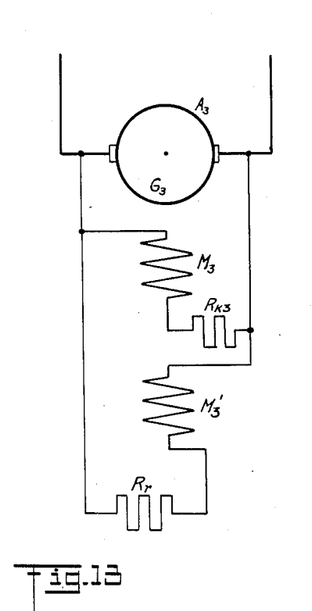

Fig. 13 shows an arrangement by which I obtain an automatic compensation for changes in the resistance of the armatures caused by temperature changes due to heavy loads. I obtain this by a predetermined increase of the voltage $u_1$ of the generator $G_1$. Since the generator $G_3$ affects the excitation of $G_1$, I provide a shunt field winding $M_3$ and a counter exciting auxiliary winding $M_3'$ for generator $G_3$. In the circuit of the auxiliary winding $M_3'$ are inserted temperature responsive resistors, which are placed in the slots of the main generator G, or of the driving motor H. Since heat develops first at these spots, the resistors increase their temperature and decrease the current in the counter exciter winding, whereby the effect of the shunt field $M_3$ is strengthened. As a final result, the voltage and frequency of the main generator G are increased, and the full torque is maintained in spite of increased resistance of all engines due to higher temperature.

In such cases where manual control overriding the automatic control is required, I provide a manually variable resistor in the place of the fixed resistor $R_k$ (Figs. 9 and 11) and this permits of increasing or decreasing the voltage of the main generator G without changing the frequency. Similarly, a variable resistor in the place of $R_{k2}$ (Figs. 9 and 11) permits of changing the frequency without changing the voltage of G.

Figure 14:
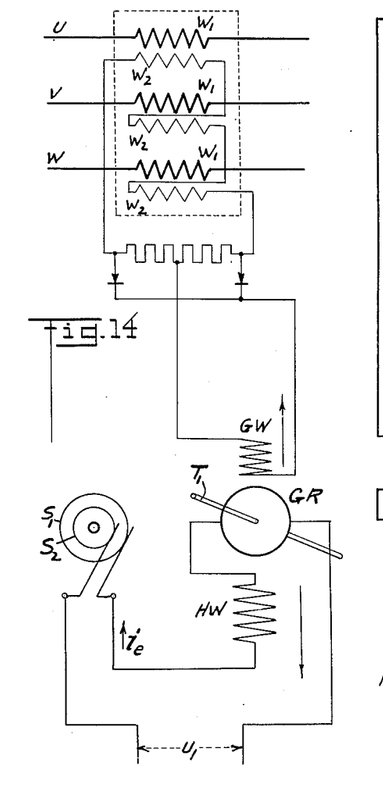
Figure 15:
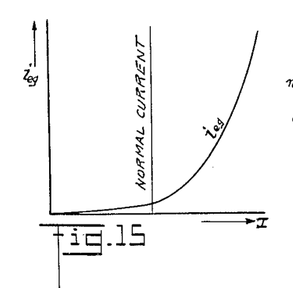
Fig. 15 shows a diagram related to automatic control.

Another structure for automatically controlling the excitation of the main generator from the main current between the generator and the drive motor M (Fig. 9) is illustrated in Fig. 14. The three lines $u, v, w$ between generator and motor lead through the primary windings $W_1$ of a three phase transformer (or three single phase transformers), and the secondary windings $W_2$ are connected in open triangle in series. The open ends are connected to a rectifier circuit and the D. C. from this circuit is fed into the field winding GW of an auxiliary generator GR. This auxiliary generator is driven by the shaft $T_1$ and has a series field winding HW. It is inserted into the exciter circuit of the main generator G in lieu of the resistor $R_k$ (Fig. 9). Inspection of this arrangement will show that the voltages in the three secondary windings cancel each other out, and no current is fed to the field GW, until the increasing saturation of the cores of the transformers causes the third harmonics to increase. Since these third harmonics do not cancel each other, a current $i_{eg}$ proportional thereto is fed from the rectifier to the field GW. This field GW acts opposite to the series field HW and decreases it, so that the effective resistance of the generator GR to the flow of the exciter current $i_e$ of the main generator G is decreased. Fig. 15 gives the relation between the main current I and the auxiliary exciter current $i_{eg}$. It should be noted here that if the main generator is provided with commutating poles, such poles induce a voltage in the exciter field which tends to increase the exciter current, provided the direction of rotation of the armature A and of the brushes $B_e$ are the same (Figs. 1 and 2).

Figure 16:
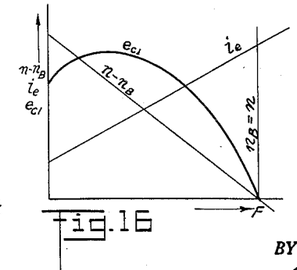
Fig. 16 is a diagram related to commutation on a generator according to the invention.
Figure 17:
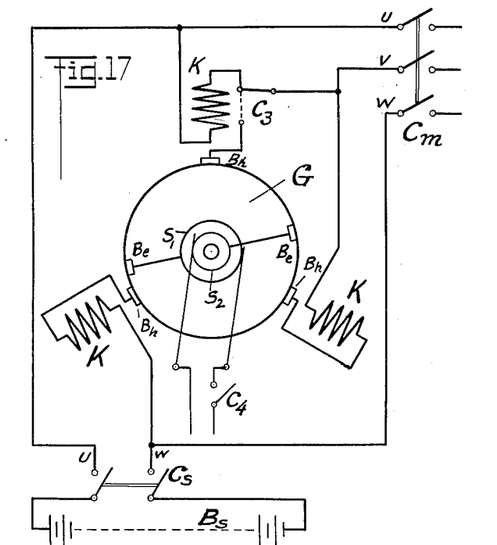
Fig. 17 shows schematically an arrangement for starting an internal combustion engine by means of a generator of the kind described.

Fig. 16 shows the relation between the frequency developed by the main generator G and the commutation voltage for the exciter brushes $B_e$. This voltage $e_{c1}$ depends upon the exciter current $i_e$ and the relative speed of the brushes upon the commutator. If the exciter current follows the law disclosed in Figs. 7 and 8, we find the voltage $e_{c1}$ to be a minimum at standstill of the brushes, or frequency zero, then rise to a maximum and finally drop to zero when the speed of the brushes equals that of the commutator. This is one of the reasons for rotating the brushes in the same direction as the commutator. The commutation voltage $e_{c2}$ for the main brushes $B_h$ is determined only by the leakage field of the main windings, since the generator is fully compensated. For larger engines it is advisable to use commutating poles.

Where the prime mover H (Fig. 1) driving the generator G is an internal combustion engine, it is desirable to use the main generator as a starter motor. In order to accomplish this, I provide a starting switch arrangement in accordance with Fig. 17, where a storage battery $B_s$ may be connected through the switch $C_s$ to two of the main wires ($u$ and $w$). Simultaneously the main wires to the driving motor are interrupted at $C_m$, the stator winding K which has one end connected to line $u$ has its other end disconnected from the brush $B_h$ and connected to line $u$, by the control $C_3$. At the same time the exciter circuit is interrupted at $C_4$. Under these conditions, the generator G will start as a series wound D. C. motor with the stator windings K of two phases serving as compensation windings while the third winding K provides a series field winding.

Whereas I have described the working of a power transmission system in accordance with my invention in several examples using three phase induction motors, it is to be understood that polyphase synchronous motors may be used in combination with my variable frequency generator whenever such arrangements seem advantageous. The differences in the conditions for frequency and voltage control between these two types of motors have been pointed out and the application of my invention in either case described so that it will be clearly understandable to those skilled in the art.

Figure 18:
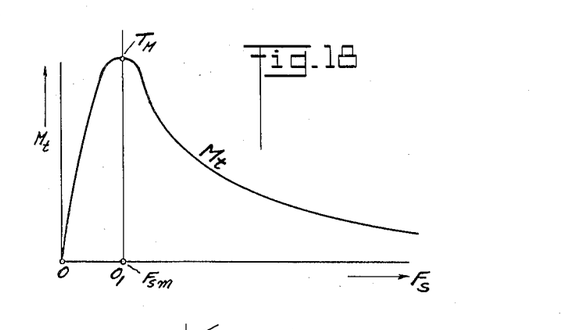
Fig. 18 is a diagram relating to the stalling of of polyphase motors.

Induction motor as well as synchronous motor may be stalled if the torque imposed upon them exceeds the maximum pull out torque for the particular motor. Fig. 18 shows diagrammatically the relation of torque and slip-frequency $f_s$ for an induction motor. In the case of a synchronous motor, the phase angle between the rotating field of the current and the exciter field has a critical value beyond which the motor stalls. In Fig. 18, it is seen that the motor stalls whenever the torque exceeds the maximum TM and the slip frequency increases beyond $f_{sm}$. This is very annoying in vehicle drives, and it is highly desirable to have a motor that will deliver the maximum torque when at standstill.

Figure 19:
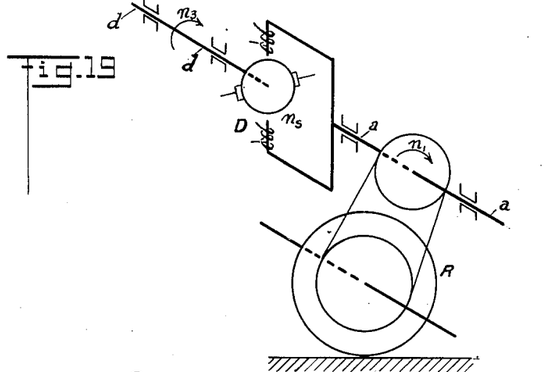
Figs. 19, 20 and 21 show schematically arrangements for preventing stalling.

According to my invention, I provide means whereby the slip frequency is controlled so that it reaches the critical value $f_{sm}$ only at standstill of the motor. In other words, the speed-torque diagram obtained by my invention will correspond to that which may be as made from Fig. 18 by moving the origin of the coordinate system from O to the point $O_1$. The maximum torque is then developed at standstill. The arrangement shown in Fig. 19 will accomplish this. The shaft $a$—$a$ is driven from a wheel R of the vehicle. Fastened to this shaft is the stator of a motor D, while the armature of this motor is fastened to a shaft $d$—$d$. This shaft $d$—$d$ drives that element which controls the frequency of the main generator, for example, the generator $G_1$ in Fig. 9. The motor D maintains between its stator and its rotor the speed $n_s$, so that the shaft $d$—$d$ is now rotating at a speed $n=n_1+n_s$. If $n_s$ is now kept constant, then the frequency of the main generator is always by a figure proportional to $n_s$ greater (or smaller) than that corresponding to $n_1$ which is the speed of the wheels. I so arrange these relations between speeds and frequencies, that when the shaft $d$—$d$ rotates at speed $n_s$, it causes the frequency $f_{sm}$ to be generated in the main generator. Since this happens at standstill of shaft $a$—$a$ ($n_1=0$) this is exactly the case illustrated in Fig. 18 with the origin moved to the point $O_1$.

It is to be understood that in lieu of the motor D, any other means for maintaining a predetermined speed difference may be used; such means may be a mechanical gearing, or a hydraulical device, or of any other convenient kind.

Figures 20, 21:
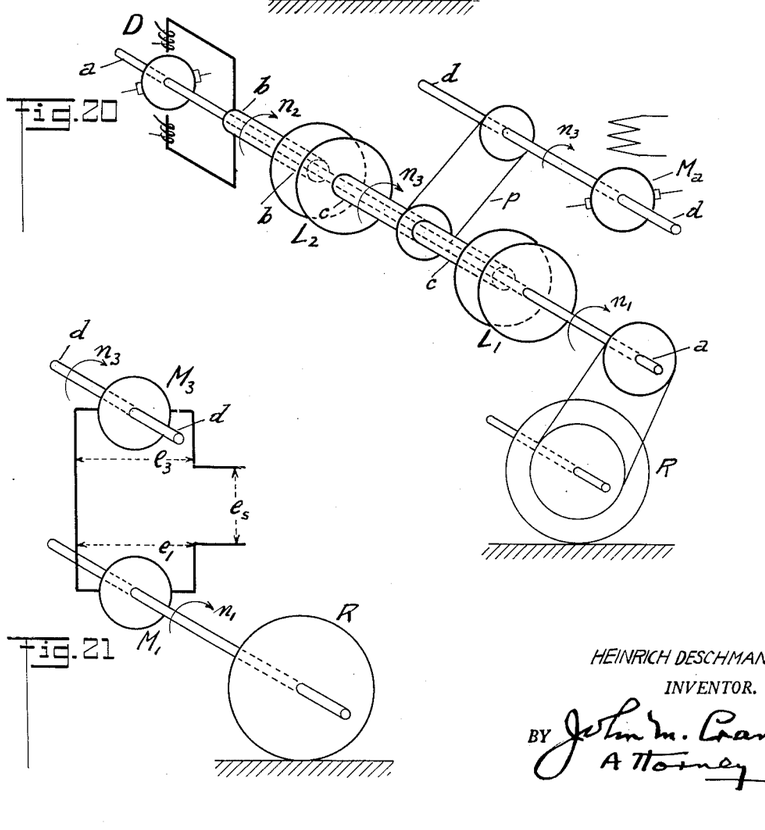

An alternative arrangement is shown in Fig. 20. In this case the frequency generated by the main generator may vary between a higher and a lower limit, one of these being again the critical value $f_{sm}$ at which the maximum torque is developed by the driving motor. A shaft $d$—$d$ is provided with a motor $M_a$ that tends to drive it at a certain speed. The shaft $d$—$d$ in turn drives the element which controls the frequency of the main generator G, for example the engine $G_2$ or the generator $G_1$. Any arrangement by which the frequency of the main generator is controlled in proportion to the speed of $d$—$d$ is suitable for this purpose. The driving connection $p$ to the sleeve shaft $c$—$c$ limits the speed of $d$—$d$ to the speed of $c$—$c$. Inside the sleeve shaft $c$—$c$ is the extension of the shaft $a$ which is driven from the driving wheel R. The sleeve shaft $b$—$b$ which also surrounds the shaft $a$ is driven from it through the motor D, which functions similar to what has been described in Fig. 19, that is, it establishes a predetermined difference of speed between shaft $a$ and shaft $b$. Two free wheeling devices, $L_1$ and $L_2$ are arranged at both sides of the sleeve shaft $c$—$c$. This arrangement causes that the speed $n_3$ is held between the limits of $n_1$ and $n_2$. Since $n_1$ becomes zero for standstill of the vehicle, the structure is so arranged that this corresponds to the critical frequency $f_{sm}$ where the maximum torque is delivered by the motor H (Fig. 9). The frequency can then be varied, in accordance to other automatic or manual controls, between these two limits, but it is prevented to cause a slip frequency in the motors that would be larger than the critical value $f_{sm}$.

Fig. 21 discloses another arrangement for obtaining a similar result. In this case, I provide means generating a voltage proportional to the speed at which they are rotated, and then arrange a circuit in which the individual voltages are combined into one resultant voltage. Similar to Fig. 20, the shaft $d$—$d$ again controls the frequency of the main generator G. It carries the armature of D. C. motor $M_3$, while the driving wheel R is connected to the armature of another D. C. generator $M_1$. I provide each of these machines with a constant field, so that the voltages generated by each will be proportional to their respective speeds, $n_1$ and $n_3$. The two armatures are connected in series as shown and in the circuit is inserted a constant voltage $e_s$. The effect of this will be that the speed of $M_3$ will differ from that of $M_1$ by a speed $n_s$ which corresponds to the auxiliary voltage $e_s$. Since the frequency of the main generator is made to correspond to $n_3$, it is obvious that for $n_1$=zero, that is at standstill, of the vehicle, the frequency of the generator G will correspond to $n_s$; the auxiliary voltage $e_s$ is now adjusted till the frequency of the main generator reaches the value of $f_{sm}$ for $n_3=n_s$. This again gives the maximum torque at standstill of the vehicle, without stalling the motor H.

It is to be understood that the above described arrangements have been given by way of examples and that various other means can be used to obtain the same result without deviating from the scope of my invention. Instead of using D. C. generators in an arrangement such Fig. 21, synchronous generators may be used and their frequencies combined under through a frequency transformer, so that the frequency of the main generator will correspond to the sum of the frequencies so combined. Again, mechanical, hydraulical or other means may be used to achieve the desired result in the manner above explained.

Whereas I have described my invention and the way in which it may be carried out in connection with several examples of specific applications, it is to be understood that I do not in any way limit my invention to these specific examples of application so described, and that the scope of my invention shall not be limited except as defined by the following claims when interpreted in connection with the laws and statutes relating to same.

I claim:

1. In an electric power transmission system, a variable frequency generator driven from a main shaft, said generator having means for varying said frequency independently of the rotational speed of said generator, a load driving motor electrically connected to said generator, speed sensitive governing means comprising a control generator driven from said main shaft, said speed sensitive governing means being operatively connected to said variable frequency generator whereby said frequency is varied in response to changes in the voltage produced by said control generator.

2. In an electric power transmission system, a variable frequency generator driven from a main shaft, said generator having means for varying the frequency independently of the rotational speed of said generator, a load driving motor electrically connected to said generator, speed sensitive governing means comprising a control generator driven from said main shaft, said control generator having a stationary magnetic field circuit, means for exciting said magnetic field circuit so as to operate at a point below the saturation point of said magnetic circuit, and means adapted to vary the frequency produced by said first named generator in response to changes in the voltage produced by said control generator.

3. A system of electric power transmission, comprising a variable frequency generator driven from a main shaft, a load driving motor electrically connected to said generator, said generator having means for varying the frequency produced by it independently of the speed at which said generator is driven from said main shaft, a governor system driven from said main shaft and adapted to control the frequency produced by said generator, said governor system comprising a control generator and electrical means arranged to operate said control generator in that section of its characteristic which is below the saturation point of the field of said control generator, whereby the frequency variations produced by said first named generator are greater than the variations in the speed at which said last named generator is driven from said main shaft.

4. In a power transmission system including a multi-phase variable frequency electric generator and a multiphase motor driving the load shaft, a control generator and means causing the frequency of said first named generator to vary in response to the voltage poduced by said control generator, an auxiliary motor mechanically connected to drive said control generator, an auxiliary generator driven from said load shaft and a fixed voltage source connected electrically in series with said auxiliary generator and said auxiliary motor whereby the voltage impressed upon said auxiliary motor is the sum of the voltage generated by said auxiliary generator plus the voltage of said fixed voltage source.

HEINRICH DESCHMANN.

REFERENCES CITED

The following references are of record in the file of this patent:

UNITED STATES PATENTS

| Number | Name | Date |
| --- | --- | --- |
| 422,857 | Van Depoele | Mar. 4, 1890 |
| 522,241 | Thompson | July 3, 1894 |
| 522,820 | Bentley | July 10, 1894 |
| 546,191 | Rice | Sept. 10, 1895 |
| 1,115,948 | Lord | Nov. 3, 1914 |
| 1,352,794 | Dutreux | Sept. 14, 1920 |
| 1,375,393 | Johnstone | Apr. 19, 1921 |
| 1,458,601 | Tanner | June 12, 1923 |
| 1,473,900 | Bushnell | Nov. 13, 1923 |
| 1,522,218 | Webb | Jan. 6, 1925 |
| 2,005,894 | Hellmund | June 25, 1935 |
| 2,054,662 | Saunders | Sept. 15, 1936 |
| 2,179,283 | Deeg | Nov. 7, 1939 |
| 2,182,644 | Schaelchlin | Dec. 5, 1939 |
| 2,298,134 | Kilgore et al. | Oct. 6, 1942 |
| 2,406,381 | Jones et al. | Aug. 27, 1946 |
| 2,431,252 | Hornbarger | Nov. 18, 1947 |

FOREIGN PATENTS

| Number | Country | Date |
| --- | --- | --- |
| 149,932 | Great Britain | Feb. 21, 1920 |
| 150,746 | Great Britain | Jan. 6, 1921 |
| 210,482 | Great Britain | Feb. 4, 1924 |